(12) United States Patent
Ploss et al.

(10) Patent No.: US 10,641,641 B2
(45) Date of Patent: May 5, 2020

(54) METHOD FOR ASCERTAINING A CHARACTERISTIC VARIABLE FOR EVALUATING A MEASURING ARRANGEMENT COMPRISING A CLAMP-ON, ULTRASONIC, FLOW MEASURING DEVICE AND A PIPE AND/OR FOR EVALUATING MEASUREMENT OPERATION OF SUCH A MEASURING ARRANGEMENT

(71) Applicant: Endress + Hauser Flowtec AG, Reinach (CH)

(72) Inventors: Peter Ploss, Erlangen (DE); Stefan J. Rupitsch, Nuremberg (DE); Michal Bezdek, Aesch (CH); Thomas Frohlich, Munchenstein (CH); Beat Kissling, Reinach (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 241 days.

(21) Appl. No.: 15/571,066

(22) PCT Filed: Apr. 26, 2016

(86) PCT No.: PCT/EP2016/059310
§ 371 (c)(1),
(2) Date: Nov. 1, 2017

(87) PCT Pub. No.: WO2016/184648
PCT Pub. Date: Nov. 24, 2016

(65) Prior Publication Data
US 2018/0164144 A1 Jun. 14, 2018

(30) Foreign Application Priority Data
May 18, 2015 (DE) .................. 10 2015 107 753

(51) Int. Cl.
*G01F 25/00* (2006.01)
*G01F 1/66* (2006.01)

(52) U.S. Cl.
CPC .......... *G01F 25/0007* (2013.01); *G01F 1/662* (2013.01); *G01F 1/665* (2013.01); *G01F 1/667* (2013.01); *G01F 1/668* (2013.01)

(58) Field of Classification Search
CPC .......... G01F 1/662; G01F 1/665; G01F 1/667; G01F 1/668; G01F 25/0007
(Continued)

(56) References Cited

U.S. PATENT DOCUMENTS 3,869,915 A   3/1975  Baumoel
6,209,388 B1 * 4/2001  Letton ................. G01F 1/74
                                                  73/61.79
(Continued)

FOREIGN PATENT DOCUMENTS

DE    19625667 A1   1/1998
DE    69625402 T2   5/2003
(Continued)

OTHER PUBLICATIONS

German Search Report, German Patent Office, Munich, DE dated Feb. 24, 2016.
(Continued)

*Primary Examiner* — John H Le
(74) *Attorney, Agent, or Firm* — Bacon & Thomas, PLLC (57) ABSTRACT

A method for ascertaining a characteristic variable for evaluating a measuring arrangement comprising a clamp-on, ultrasonic, flow measuring device and a pipe, on which the clamp-on, ultrasonic, flow measuring device is secured, and/or for evaluating measurement operation of such a measuring arrangement, characterized by the method steps as follows: A) providing characteristic values relative to an exciter signal produced by the clamp-on, ultrasonic, flow measuring device; B) providing sensor-specific data as regards acoustic properties of one or more ultrasonic transducers of the clamp-on, ultrasonic, flow measuring device C) inputting data relative to the pipe material and the pipe wall thickness, especially inputting such data by a user, and
(Continued)

D) ascertaining the characteristic variable from the parameters and data of steps A-C based on a mathematical model, as well as a computer program product and a clamp-on, ultrasonic, flow measuring device.

12 Claims, 4 Drawing Sheets

(58) Field of Classification Search
USPC ......... 702/90, 100, 182, 183, 189; 73/61.79, 73/861.25, 861.27, 861.28
See application file for complete search history.

(56) References Cited

U.S. PATENT DOCUMENTS

2006/0259260 A1* 11/2006 Frohlich ................... G01F 1/66
702/100
2007/0151362 A1    7/2007 Mori et al.

FOREIGN PATENT DOCUMENTS

| DE | 102009046871 A1 | 6/2010 |
| DE | 102011005170 A1 | 9/2012 |
| DE | 102015107753 A1 | 11/2016 |
| WO | WO8808516 A1 | 11/1988 |

OTHER PUBLICATIONS

International Search Report, EPO, The Netherlands, dated Apr. 26, 2016.
English Translation of the International Preliminary Report on Patentability, WIPO, Geneva, CH, dated Nov. 30, 2017.
M.G.S. Ali and A. Raouf Mohamed; "A Simulation of Pulse—Echo Amplitude Scan Signal Formation in Absorbing Media"; Ultrasonic 1992 vol. 30., No. 5.; 1992 Butterworth-Heinemann Ltd.

* cited by examiner

METHOD FOR ASCERTAINING A CHARACTERISTIC VARIABLE FOR EVALUATING A MEASURING ARRANGEMENT COMPRISING A CLAMP-ON, ULTRASONIC, FLOW MEASURING DEVICE AND A PIPE AND/OR FOR EVALUATING MEASUREMENT OPERATION OF SUCH A MEASURING ARRANGEMENT

TECHNICAL FIELD

The invention relates to a method for ascertaining a characteristic variable as well as to a computer program product and to a clamp-on, ultrasonic, flow measuring device.

BACKGROUND DISCUSSION

Ultrasonic, flow measuring devices are widely applied in process and automation technology. They permit simple determination of volume flow and/or mass flow in a pipeline. Known ultrasonic, flow measuring devices work frequently according to the travel-time difference principle. In the case of the travel-time difference principle, the different travel times of ultrasonic waves, especially ultrasonic pulses, so-called bursts, are evaluated as a function of flow direction of the liquid. For this, ultrasonic pulses are sent at a certain angle to the pipe axis both with, as well as also counter to, the flow. From the travel-time difference, the flow velocity, and therewith, in the case of the known diameter of the pipeline section, the volume flow rate, can be determined.

The ultrasonic waves are produced, respectively received, with the assistance of so-called ultrasonic transducers. In the case of a widely used manner of construction of clamp-on, ultrasonic, flow measuring devices, the ultrasonic transducers are pressed externally on the wall of a pipe. A great advantage of clamp-on, ultrasonic, flow measuring systems is that they do not contact the measured medium and are placed on an already existing pipeline.

The ultrasonic transducers are, normally, each composed of an electromechanical transducer element, e.g. a piezoelectric element, and a coupling element, the so-called coupling wedge. In the case of clamp-on-systems, the ultrasonic waves are produced in the electromechanical transducer element as acoustic signals and led via the coupling element to the pipe wall and from there into the fluid, i.e. the measured medium.

In the case of clamp-on, ultrasonic, flow measuring devices, depending on the embodiment of the measuring point, a complex measurement error can result, which depends on different influencing factors.

SUMMARY OF THE INVENTION

It is, consequently, an object of the present invention to provide a method, which enables estimating the measurement error and, in given cases, ascertaining a characteristic variable for compensating for this measurement error.

The present invention achieves this object by a method for ascertaining a characteristic variable for evaluating a measuring arrangement comprising a clamp-on, ultrasonic, flow measuring device and a pipe, on which the clamp-on, ultrasonic, flow measuring device is secured and/or for evaluating measurement operation of such a measuring arrangement is characterized by method steps as follows:

A providing characteristic values relative to an exciter signal produced by the clamp-on, ultrasonic, flow measuring device;

B providing sensor-specific data as regards acoustic properties of one or more ultrasonic transducers of the clamp-on, ultrasonic, flow measuring device;

C inputting data relative to pipe material and pipe wall thickness, especially inputting such data by a user, and D ascertaining the characteristic variable from the parameters and data of steps A-C based on a mathematical model.

The method can be implemented as a pure simulation program, e.g. in a sales platform, in order to test whether the measuring point is compatible with the particular clamp-on ultrasonic, flow meter. Alternatively, it can also be implemented in the measuring device or in a control system.

As is known, it must be taken into consideration in the case of clamp-on-systems that the ultrasound must travel through a plurality of different layers of material, until it enters into the measured medium. The characteristic variable, thus e.g. the angle, with which the ultrasonic signal enters from the pipe wall in the medium, depends, among other things, on the properties of the material components used in the ultrasonic transducer and on the geometric embodiment, e.g. the wedge angle, and can change from transducer to transducer. The properties and characteristics of the individual materials can, however, for example, due to manufacturing tolerances and different temperature dependences, be only partially preset in the factory and taken into consideration in the measuring.

Thus, it is e.g. possible to furnish individual sensor-specific data of the ultrasonic transducer from the beginning in a database. These relate e.g. to the diameter of the electromechanical transducer element, data (wedge angle and material properties) relative to one or more coupling bodies and the transfer behavior, especially the center frequency and the bandwidth, of the ultrasonic transducers, individually or in the form of a formula. There is, however, also the option that the providing of this data occurs not earlier in the factory in a database, but, instead, is input by the customer or a service technician on-site.

A further influencing factor according to the teaching of the invention is to be seen in the exciter signal. Here, especially the bandwidth and the excitation frequency are relevant, which most often, in given cases, can be combined with additional data in an excitation function. Also the characteristic values of the exciter signal can be determined in the factory and furnished in a database or provided by user input.

Correspondingly, mathematical models are known from the literature. For example, a corresponding mathematical model is described e.g. in the article "Acoustic Transfer Function of the Clamp-On Flowmeter" by Funck and Mitzkus (IEEE Transactions on Ultrasonics, Ferroelectrics, and Frequency Control, Vol. 43, No. 4, 1996, pgs. 569-575).

Data relative to the measuring point must be separately input and can most often not be preset. Pertinent in this regard are especially the pipe material and the pipe wall thickness. The pipe diameter is, in such case, not absolutely required for ascertaining the relative measurement error, but, instead, only for determining the flow rate and, thus, the absolute measurement error of the flow rate.

Moreover, clamp-on, ultrasonic, transducers can be installed to operate in one or two or multi-traverse modes. This can likewise be taken into consideration in ascertaining the characteristic variable.

Other advantageous embodiments of the invention are subject matter of the dependent claims.

Advantageously, supplementally to the steps (A-D), in a step (F1), output of a construction type dependent and/or excitation related, error report occurs using an actual/desired value comparison based on the characteristic variable.

Moreover, advantageously, supplementally to steps (A-D), a step (F2) provides a quantified output of the characteristic variable or a quantified output of a measurement error calculated from the characteristic variable.

In addition to the steps (A-D), in a step (F3), based on the characteristic variable, a failure diagnosis can be initiated, in the case of which the data of steps A-C are checked for compatibility. Thus, it can be checked, based on a database, whether data lie significantly outside of the standard deviation region.

Advantageously, the ascertained characteristic variable is the angle, thus the angle in the fluid, with which the sound mainly propagates through the fluid located in the pipe, and, in given cases, a dominant frequency.

The ascertained characteristic variable can especially be the angle in the fluid, with which the sound mainly propagates through the fluid located in the pipe. Based on this angle, an estimate can be made, whether a measurement error is present and how high such is.

Advantageously, the characteristic values with reference to the exciter signal of the clamp-on flow measuring device according to step A are selected from values as follows:
 the excitation frequency of the exciter signal
 the bandwidth of the exciter signal
 the repetition frequency of the excitation cycles
 the signal type e.g. sine- or rectangular signal and/or
 type of the function window e.g. rectangle-, von Hann- or Tukey window.

Advantageously, the sensor-specific data of the clamp-on ultrasonic device are selected from values as follows:
 the diameter of the electromechanical transducer element, e.g. the piezoceramic, of a particular ultrasonic transducer,
 the wedge angle of the coupling body of the particular ultrasonic transducer,
 the velocity of sound within the coupling body of the particular ultrasonic transducer, and/or
 the electrical transfer function of the particular ultrasonic transducer, especially the center frequency and the bandwidth of the ultrasonic transducer.

Of course, also a plurality of coupling bodies can be provided in an ultrasonic transducer.

Additionally, ultrasonic transducers are known having a plurality of piezoceramics arranged on top of one another. Such stacked arrangements can form an electromechanical transducer element.

The sensor-specific data according to claim 6 and/or the characteristic values of the exciter signal according to claim 5 can advantageously be combined in one provided function.

The providing of the characteristic values in step A and/or the providing of the sensor-specific data can occur by furnishing them as a data set for the particular clamp-on flow measuring device in a data memory of a data processing system and providing them from such.

In an additional step X, information can be provided relative to the construction of the measuring point, especially the number of traverses and therewith the arrangement of the ultrasonic transducer on the pipe, and taken into consideration by the mathematical model in the case of ascertaining the measurement error factor.

According to the invention, a computer program product is provided, which is executed, wherein the computer program product is based on the mathematical model and, with application of the characteristic values and data of the steps A-C and, in given cases, step X, ascertains a measurement error factor, which is suitable for failure diagnosis.

According to the invention, a clamp-on, ultrasonic, flow measuring device is provided, comprising at least one ultrasonic transducer secured outwardly on a pipeline and an evaluation unit, which is designed for performing the method as claimed in one of the preceding claims and which performs a correction of measurement error in real time based on the ascertained measurement error factor.

The clamp-on, ultrasonic, flow measuring device can ascertain the flow velocity and/or the volume flow rate based on the travel-time difference. In such case, two ultrasonic transducer are required. Alternatively, the clamp-on, ultrasonic, flow measuring device can also have only one ultrasonic transducer and ascertain the flow velocity according to the Doppler principle.

BRIEF DESCRIPTION OF THE DRAWINGS

The invention will now be explained in greater detail based on an example of an embodiment and based on the appended figures. The figures of the drawing show as follows.

DETAILED DISCUSSION IN CONJUNCTION WITH THE DRAWINGS

Clamp-on, ultrasonic, flow measuring devices are known per se. These measuring devices can be used to perform flow determination either based on the travel-time difference principle or according to the Doppler principle. The determination by means of the Doppler principle can be performed with only one ultrasonic transducer, while, in the case of the travel-time difference principle, at least two ultrasonic transducers are applied.

For the flow measurement, exciter signals with a certain excitation frequency are produced. The excitation frequency is most often selected by the flow measuring device itself from a predetermined frequency range and lies often in the region of the center frequency of the ultrasonic transducers being used.

Figure 1:
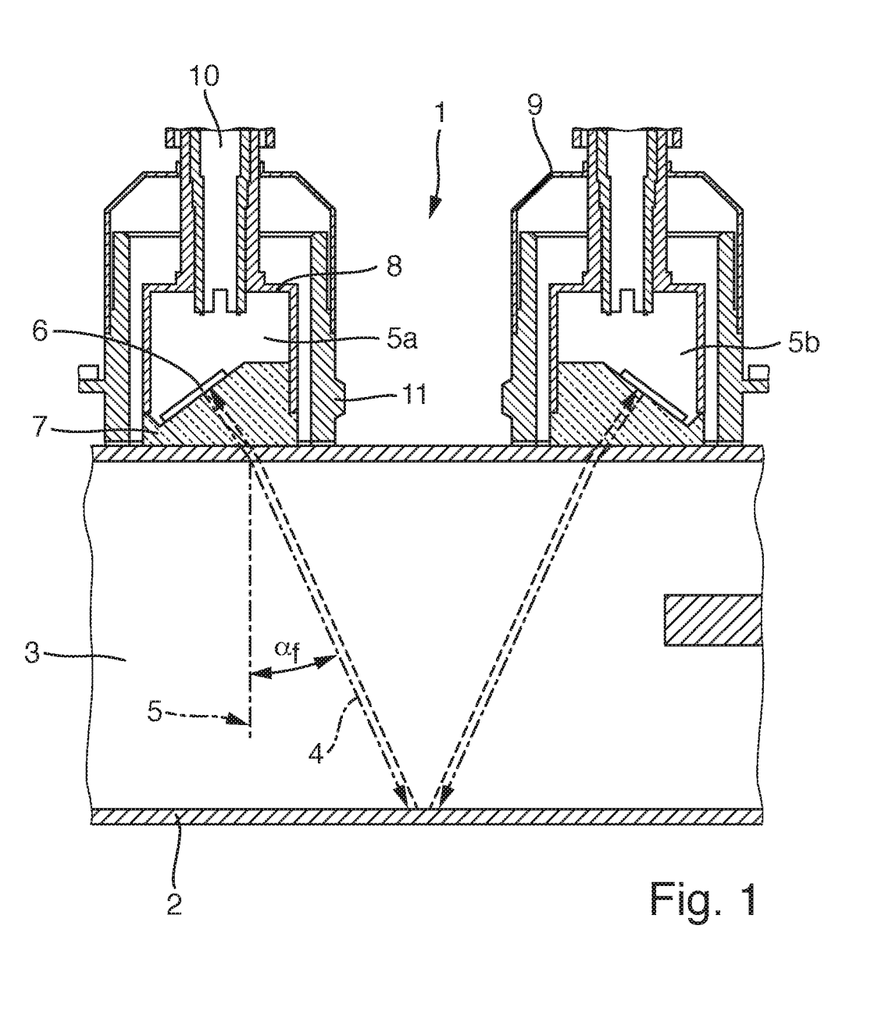
FIG. 1 is a schematic representation of a clamp-on, ultrasonic, flow measuring device.

FIG. 1 shows an arrangement with a clamp-on, ultrasonic, flow measuring device 1 in the installed state on a pipeline 2. Located in the pipeline 2 is a measured medium 3, which ideally flows through the pipeline 2 in the stream, or flow, direction S.

The schematically shown clamp-on, ultrasonic, flow measuring device 1 is composed preferably of two ultrasonic transducers 5a and 5b, which are placed externally on the measuring pipe and connected releasably or non-releasably with the pipeline 2. The illustrated variant concerns a two-traverse arrangement. However, other arrangements are possible, e.g. a one-traverse arrangement.

The ultrasonic transducer 5a shown in FIG. 1 is mounted by means of a holding element 11 for securing the ultrasonic transducer 5a on the pipeline 2. The holding element 11 and the ultrasonic transducer 5a are part of an ultrasonic transducer arrangement. The ultrasonic transducer 5a includes a housing 9, which is connectable with the holding element 11, e.g. frictionally held or by shape interlocking.

A corresponding ultrasonic transducer 5a includes an electromechanical transducer element 6, e.g. a piezoelement, connected via an electrical connection, e.g. a cable, with an evaluation unit (not shown). The corresponding connection is, in such case, led away from the electromechanical transducer element 6 through a cylindrical cable guide 10 having a longitudinal axis perpendicular to the pipeline 2.

Ultrasonic transducer 5a additionally includes between the electromechanical transducer element 6 and the pipeline 2 a coupling body 7, which has a bearing surface against the pipe of the pipeline 2 and an area tilted relative to this bearing surface for arrangement of the electromechanical transducer element 6.

For ascertaining a flow rate or a flow velocity during the measuring, the clamp-on, ultrasonic, flow measuring device, especially the electromechanical transducer element 6 of the ultrasonic transducer 5a, transmits an ultrasonic signal with dominant transmission frequency $f_{ex}$ and this signal is received by the ultrasonic transducer 5b.

The measuring occurs according to the travel-time difference principle. Therefore, ultrasonic signals are transmitted and received once inclined in, and once inclined counter to, the flow direction S.

For the choice of the excitation frequency $f_{ex}$ of the electromagnetic transducer element 6, it is known to use the center frequency of the transducer element 6.

Figure 2:
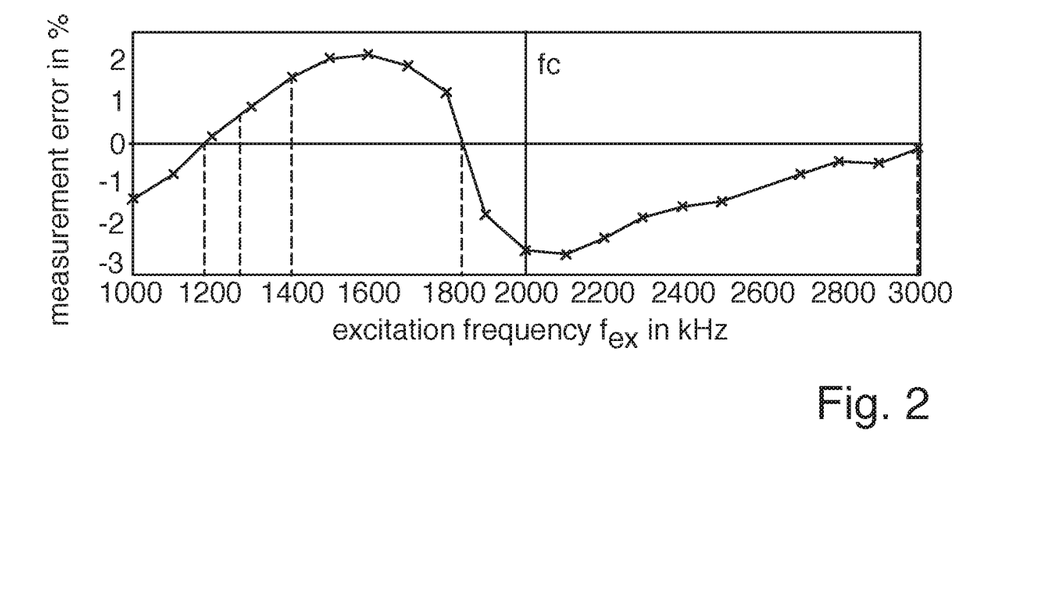
FIG. 2 is by way of example, a graph of measurement error versus frequency.

It has been found, however, that the center frequency as excitation frequency is not always the optimal choice for the operation of an ultrasonic, flow measuring device. FIG. 2 is a graph of how the measurement error changes in the frequency range of an ultrasonic transducer. The curve was ascertained for a rotary plant, e.g. a bottling plant, in the case of a volume flow of 20 l/s.

The two ultrasonic transducers of the clamp-on system were secured on a DN80 pipe of steel with a pipe wall thickness of 2 mm. The center frequency $f_c$ was 2 MHz. As can be seen, the relative measurement error in the region of the center frequency is relatively high in the case of this arrangement.

A total measurement error of the clamp-on measuring device includes, however, besides the frequency dependent measurement error, other components, which act to reduce a best possible measuring accuracy.

An appropriate process flow will now be described. First comes customer data.

This includes
A1 pipe material
B1 pipe wall thickness.

Additionally, there can be other customer data. This includes:
A2 measuring arrangement data, especially the number of traverses.

This optional data can, however, also be furnished in a database in the measuring device for a particular mounting arrangement. Thus, it is e.g. possible that the device is always assembled in a two-traverse arrangement, such as shown in FIG. 1. Should this be the case, it needs no separate input. It can also be provided that the center frequency and/or the bandwidth of the exciter signal are also furnished in the device.

Also furnished in the database in the device is the electrical transfer function of the ultrasonic transducer, with its first bandwidth and its first center frequency. In the case of two ultrasonic transducers, at least two transfer functions are furnished. Also furnished in the database in the device for each ultrasonic transducer is at least one electrical transfer function with its first bandwidth and its first center frequency for at least one temperature of the respective ultrasonic transducer. However, also a plurality of electrical transfer functions can be furnished for each ultrasonic transducer for a plurality of temperature ranges or temperatures.

Also furnished in the database in the device is a mechanical transfer function of the pipe, or the pipeline, e.g. in the form of a transmission coefficient in the fluid dependent on frequency and angle. However, also a plurality of mechanical transfer functions can be furnished for the pipe for a plurality of temperature ranges or temperatures.

These electrical transfer functions of the one or more ultrasonic transducers are additionally supplemented by sensor-specific data, which are selected from the following group and which are furnished in the device or input by the user:
A3 diameter of the piezoceramic,
B3 wedge angle of the coupling body,
C3 velocity of sound within the coupling body,
D3 transfer function for one or more ultrasonic transducers, and/or
E3 transfer function of the pipe, or pipeline Furthermore, characteristic values relative to an exciter signal are furnished in the database or are input by the user. These characteristics values are selected from the following group:
A4 excitation frequency of the exciter signal
B4 bandwidth of the exciter signal
C4 number of excitation cycles
D4 signal type e.g. sine- or rectangular signal and/or
E4 type of function window, e.g. rectangle-, von Hann- or Tukey window.

This information can be input or furnished individually or as parameters in a function.

Figure 4:
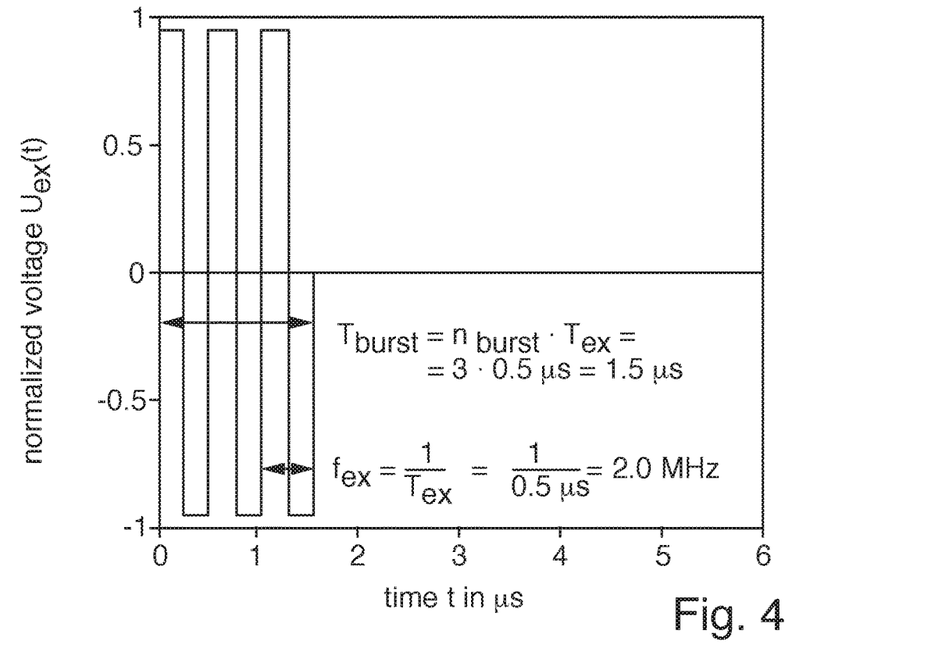
FIG. 4 is an example of an electrical exciter signal.

FIG. 4 shows, by way of example, an exciter signal as a function of time. The excitation frequency amounts to 2 MHz. The signal type is a rectangular signal. The number of the so-called bipolar bursts amounts to three. Bipolar means that the signal extends in the positive and negative voltage ranges. FIG. 4 shows the value normalized to one, since the actual voltage for the operation of the device is irrelevant, since a so-called linear, time invariant (LTI) system is assumed. The shown signal lasts $t_{burst}=1.5$ μs. The excitation frequency and the number of bursts can be selected variably. The excitation frequency $f_{ex}$ is the reciprocal of the duration of a rectangle $T_{ex}$.

Figure 5:
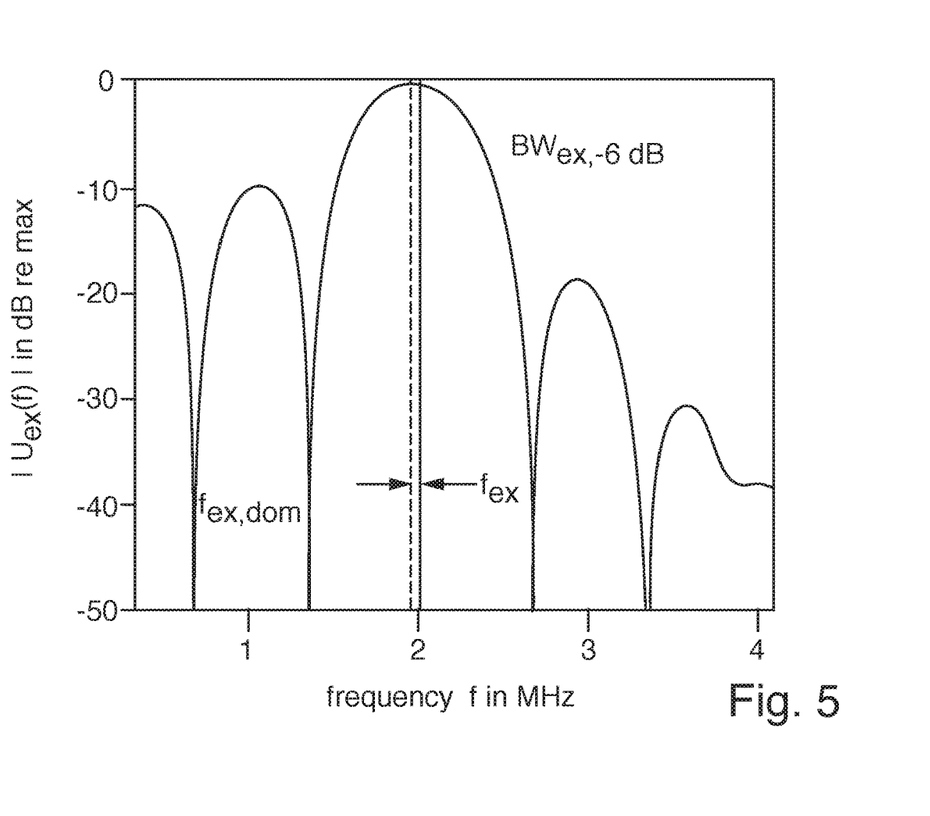
FIG. 5 is a graph of a normalized, one-sided, amplitude spectrum of an exciter signal.

Ascertained from the exciter signal FIG. 4 by calculating the Fourier-transformation, as a standard method of digital signal processing, can be the associated spectrum. This is divided typically into a phase spectrum and an amplitude spectrum. The normalized, one-sided, amplitude signal is shown in FIG. 5. Shown in the spectrum are the excitation frequency $f_{ex}$ and the strongest (dominant) frequency $f_{ex,dom}$. The deviation is not intuitive and can be explained by the spectral leakage effect. The signal is characterized, furthermore, by the bandwidth, e.g. the width of the main lobe at −6 dB. A further characteristic is the attenuation of the strongest side lobe.

Additionally furnished in a data carrier in the measuring device is a mathematical model.

Fed to the model as input data can be the spectrum shown in FIG. 5 (magnitude and phase). The special feature of the model is that, supplementally to frequency information, also angle information is taken into consideration. Because of this, all components of the model are modeled as a two dimensional filter with dependence on frequency and phase velocity.

A typical model, which only takes frequency into consideration, can be described with the formula $$Y(f) = \prod_n A_n(f) \cdot X(f)$$

wherein $X(f)$ corresponds to the spectrum of the excitation and $A_n(f)$ to the transfer function of the n-th model-component. $Y(f)$ is then the system response.

Corresponding mathematical models, which only take frequency into consideration are discussed in the following documents:

Ali, M.; Raouf Mohamed, A.: A simulation of pulse-echo amplitude scan signal formation in absorbing media. In: *Ultrasonics*, 30(5), 1992, pgs. 311-316, especially Equation 7, and Woeckel, S., Steinmann, U., Auge, J.: Signalanalyse für Ultraschall-Clamp-on-Systeme (Signal analysis for ultrasonic, clamp-on systems). In: *tm—Technisches Messen*, 81(2), 2014, pgs. 86-92, especially Equation 2.

Additionally to the input of the values for the pipe material and the pipe wall thickness, the mathematical model draws on the values furnished in the data memory relative to the electrical transfer functions of the ultrasonic transducers, their geometry- and material data, as well as the characteristic values of the exciter signal.

From these data, the ascertaining of an actual angle $\alpha_f$ in the fluid can occur, with which angle the sound mainly propagates in the liquid located in the pipe. This angle $\alpha_f$ in the fluid is an embodiment variant of a measurement error factor in the sense of the present invention. With it, a measurement error can be ascertained and, in given cases, also compensated, such as described e.g. in the article "Extraction of Spatial Ultrasonic Wave Packet Features by Exploiting a Modified Hough Transform" by Ploß, P., Rupitsch, S. J. and Lerch, R. (IEEE Sensor Journal, 14(7), 2014), to which comprehensive reference is taken in the context of the present invention An expanded model takes into consideration also the angle in the fluid. It is expressed as follows:

$$Y(f, \alpha_f) = \Pi_n A_n(f, \alpha_f) \cdot X(f, \alpha_f),$$

thus as in the case of the aforementioned one-dimensional model, only that both the components as well as also the in/output depend both on frequency and on angle.

Mathematical models, which take the locational information, i.e. the angle, into consideration are presented in the following documents:

Pavlakovic, B. N.; Rose, J. L.: The Influence of Finite-Size Sources in Acousto-Ultrasonics/NASA. 1994 (195374).—Research Report, especially pg. 70, and Funck, B.; Mitzkus, A.: Acoustic transfer function of the clamp-on flowmeter. In: *IEEE Transactions on Ultrasonics Ferroelectrics and Frequency Control*, 43(4), 1996, pgs. 569-575, especially Equations 27 and 33.

The angle information $\alpha_n$ of a medium n can be converted with the aid of the velocity of sound of the medium n into the phase velocity $c_p^0$:

$$c_p^0 = \frac{c_n}{\sin(\alpha_n)}$$

Figure 6:
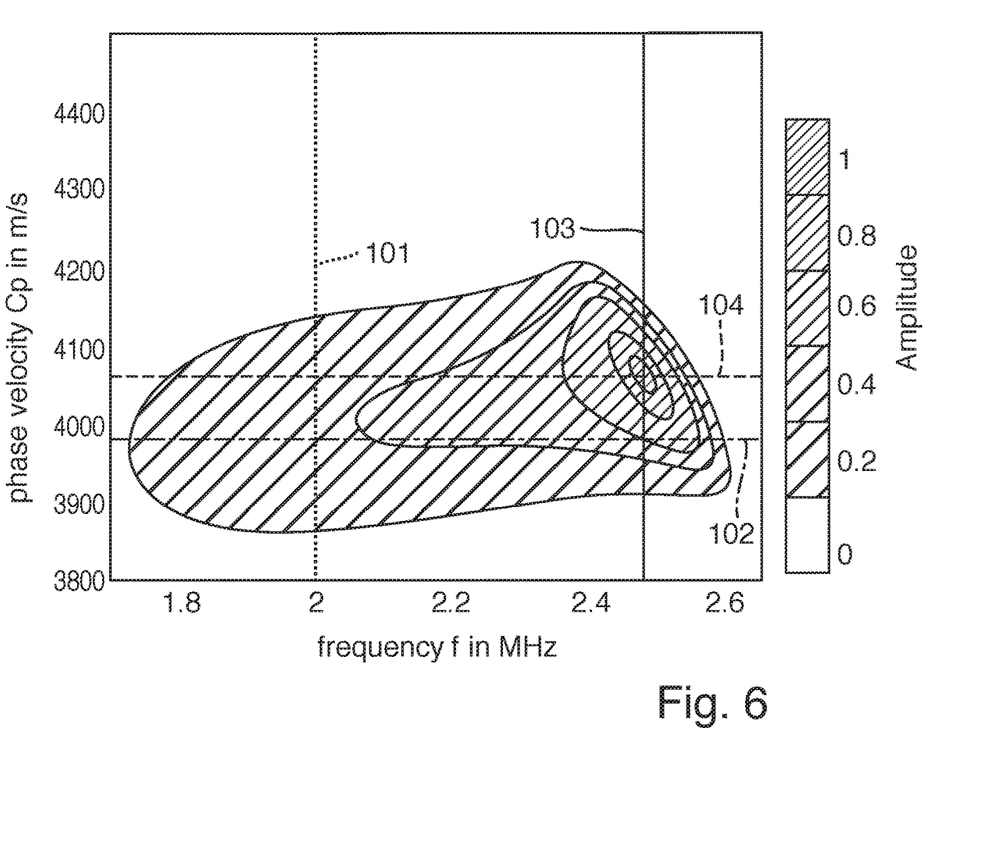
FIG. 6 is by way of example, a graph of a system response.

Shown in FIG. 6 is the two dimensional amplitude spectrum of the system response calculated with the model.

Reference character 101 refers to the electrical excitation frequency $f_{ex}$=2 MHz and reference character 102 references the expected phase velocity $c_p^0$. The phase velocity is calculated via Snell's law of refraction and, transformed into angle information, it corresponds, for water with velocity of sound 1485 m/s, to the expected angle $\alpha_f^0$ in the fluid and amounts, for instance, to 22°. That is the angle in the fluid, which angle is decisive for calculating the volume flow rate. If this angle deviates in water from the expected angle, then this leads to a measurement error of the volume flow rate.

The system response has the shape of an eye, whose pupil (the maximum) lies at a certain location of the two-dimensional coordinate system (frequency, phase velocity, or angle). If the pipe wall would not influence the sound propagation, then the maximum of the eye would lie at the intersection of the lines 101 and 102.

Since, however, the pipe wall has a significant influence on the sound propagation, the position of the eye is shifted significantly from the expected intersection. The system response can now be evaluated automatically—and, indeed, in several ways.

The simplest option for evaluation is to determine the maximum and to extract the coordinates of the same ($f_{rec,dom}$ 103 and $c_{p,rec,dom}$ 104). The vertical shift (change of the phase velocity $c_{p,rec,dom}-c_p^0$) is directly convertible into a change of the angle in the fluid. Additionally, a measurement error can be predicted. There are, however, also various other options for evaluating the system response.

In the case of ascertaining the measurement error factor, optionally also data for the measuring arrangement can be taken into consideration.

In addition to ascertaining, and, in given cases, compensating, a measurement error, the measurement error factor can also be used just to provide a failure warning, to the extent that this factor exceeds or subceeds a predetermined desired value. This failure warning can indicate to a user e.g. that a situation, or a configuration, is present, which can lead to a large measurement error. Thus, also in the context of a preliminary analysis, e.g. in an Internet sales site, after input of the pipe material and the pipe wall thickness, a measurement error factor can be ascertained for all offered clamp-on measuring devices and the most suitable product provided.

By comparison of the measurement error factor ascertained using the mathematical model with an actually measured measurement error factor, additionally, temperature influences, deposits or abrasion on the pipe wall can be identified during the measuring.

Figure 3:
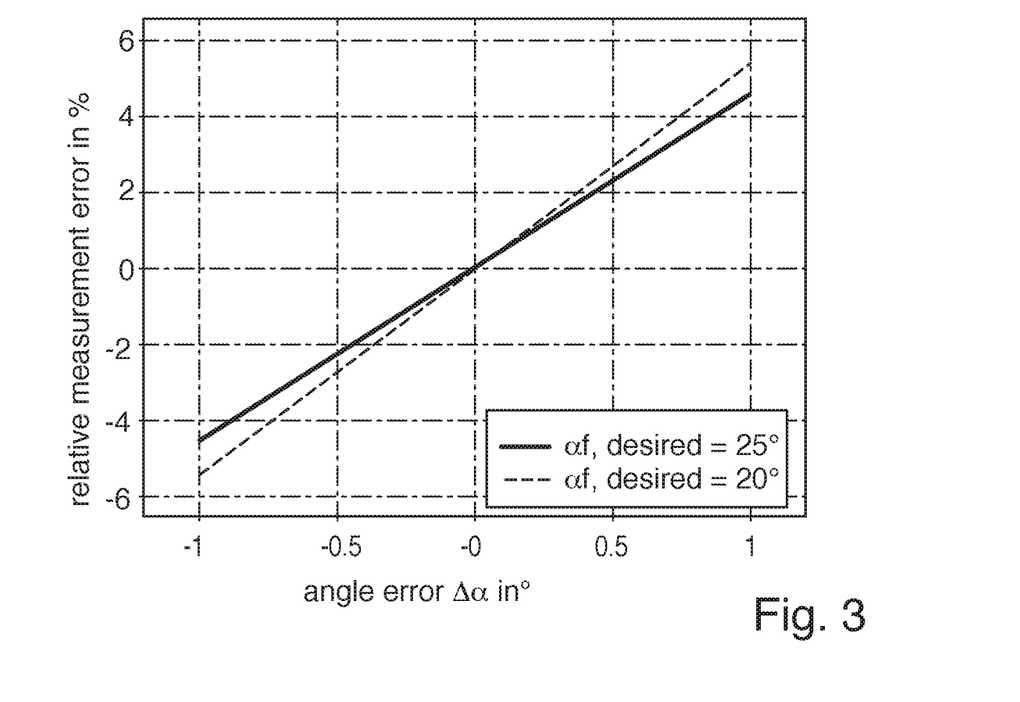
FIG. 3 is by way of example, a graph of relative measurement error versus angle error.

FIG. 3 shows the measured value error in percent versus the actual angle error in degrees. This angle error can only be determined with the aid of certain parameters, such as described above. The angle error permits a direct evaluation of the measured value error and enables a quantifying and even a compensation of the measured value error, so that a highly accurate measuring in the case of clamp-on, ultrasonic, flow measuring devices can be achieved.

What is claimed is:

1. A method for ascertaining a characteristic variable for evaluating a measuring arrangement comprising: a clamp-on, ultrasonic, flow measuring device; and a pipe, on which the clamp-on, ultrasonic, flow measuring device is secured, and/or for evaluating measurement operation of such a measuring arrangement, the method comprising the steps as follows:
   A providing characteristic values relative to an exciter signal produced by the clamp-on, ultrasonic, flow measuring device;
   B providing sensor-specific data as regards acoustic properties of one or more ultrasonic transducers of the clamp-on, ultrasonic, flow measuring device;
   C inputting data relative to pipe material and pipe wall thickness;
   D ascertaining the characteristic variable from the parameters and data of steps A-C based on a mathematical model, comprising the steps of I) calculating a system response based on the mathematical model, and II) evaluating automatically the system response to determine the characteristic variable, wherein the ascertained characteristic variable is an angle, with which the sound mainly propagates through the fluid located in the pipe; and
   E initiating a failure detection based on the characteristic variable, in the case of which the data of the steps (A-C) are checked for compatibility.

2. The method as claimed in claim 1, further comprising the steps:
   supplementally to the steps (A-D), in a step (F1), output of a construction type dependent or excitation related, error report occurs using an actual/desired value comparison based on the characteristic variable.

3. The method as claimed in claim 1, further comprising the steps:
   supplementally to the steps (A-D), a step (F2) provides a quantified output of the characteristic variable or a quantified output of a measurement error calculated from the characteristic variable.

4. The method as claimed in claim 1, wherein:
   the characteristic values with reference to the exciter signal of the clamp-on flow measuring device according to step (A) are selected from values as follows:
   the excitation frequency of the exciter signal;
   the bandwidth of the exciter signal;
   the repetition frequency of the excitation cycles;
   the signal type; and/or
   the type of the function window.

5. The method as claimed in claim 1, wherein:
   the sensor-specific data of the clamp-on ultrasonic device are selected from values as follows:
   the diameter of the electromechanical transducer element of a particular ultrasonic transducer;
   the wedge angle of the coupling body of the particular ultrasonic transducer;
   the velocity of sound within the coupling body of the particular ultrasonic transducer; and
   the electrical transfer function of the particular ultrasonic transducer.

6. The method as claimed in claim 1, wherein:
   the sensor-specific data wherein the characteristic values with reference to the exciter signal of the clamp-on flow measuring device according to step (A) are selected from values as follows: the excitation frequency of the exciter signal;
   the bandwidth of the exciter signal; the repetition frequency of the excitation cycles; the signal type; and/or the type of the function window; and/or
   the characteristic values of the exciter signal wherein the ascertained characteristic variable is the angle, with which the sound mainly propagates through the fluid located in the pipe and, in given cases, a dominant frequency
   are combined in one provided function.

7. The method as claimed in claim 1, wherein:
   the providing of the characteristic values in step (A) and/or the providing of the sensor-specific data occurs by furnishing them as a data set for the particular clamp-on flow measuring device in a data memory of a data processing system and providing them from the data memory of the data processing system.

8. The method as claimed in claim 1, wherein:
   in an additional step (X), information is provided relative to the construction of the measuring point and taken into consideration by the mathematical model in the case of ascertaining the measurement error factor.

9. The method as claimed in claim 1, wherein:
   the sensor-specific data of the clamp-on ultrasonic device are selected from values as follows:
   the diameter of the electromechanical transducer element of a particular ultrasonic transducer;
   the wedge angle of the coupling body of the particular ultrasonic transducer;
   the velocity of sound within the coupling body of the particular ultrasonic transducer; and
   the center frequency and the bandwidth of the ultrasonic transducer.

10. A computer program product, with which the following method steps:
    A providing characteristic values relative to an exciter signal produced by the clamp-on, ultrasonic, flow measuring device;
    B providing sensor-specific data as regards acoustic properties of one or more ultrasonic transducers of the clamp-on, ultrasonic, flow measuring device;
    C inputting data relative to pipe material and pipe wall thickness;
    D ascertaining the characteristic variable from the parameters and data of steps A-C based on a mathematical model are executed, comprising the steps of: I) calculating a systenmm response based on the mathematical model; and II) evaluating automatically the system response to determine the characteristic variable, wherein the ascertained characteristic variable is an angle, with which the sound mainly propagates through the fluid located in the pipe; and
    E initiating a failure detection based on the characteristic variable, in the case of which the data of the steps (A-C) are checked for compatibility, wherein:
    the computer program product is based on the mathematical model; and
    with application of the characteristic values and data of the steps A-C and, in given cases, a step X is provided which provides information relative to the construction of the measuring point and taken into consideration by the mathematical model in the case of ascertaining the measurement error factor, and, ascertains a measurement error factor, which is suitable for failure diagnosis.

11. A clamp-on, ultrasonic, flow measuring device, comprising:
- at least two ultrasonic transducers secured outwardly on a pipeline; and
- an evaluation unit, which is designed for performing the following method steps:
- A providing characteristic values relative to an exciter signal produced by the clamp-on, ultrasonic, flow measuring device;
- B providing sensor-specific data as regards acoustic properties of one or more ultrasonic transducers of the clamp-on, ultrasonic, flow measuring device;
- C inputting data relative to pipe material and pipe wall thickness;
- D ascertaining the characteristic variable from the parameters and data of steps A-C based on a mathematical model, comprising the steps of I) calculating a system response based on the mathematical model, and II) evaluating automatically the system response to determine the characteristic variable, wherein the ascertained characteristic variable is an angle, with which the sound mainly propagates through the fluid located in the pipe; and which performs a correction of measurement error in real time based on the ascertained measurement error factor; and
- E initiating a failure detection based on the characteristic variable, in the case of which the data of the steps (A-C) are checked for compatibility.

12. The clamp-on, ultrasonic, flow measuring device as claimed in claim 11, wherein:
- said clamp-on, ultrasonic, flow measuring device has at least one ultrasonic transducer and an evaluation unit, which is designed for ascertaining the angle, with which the ultrasonic signal enters from the pipe wall into the medium.

* * * * *